United States Patent
Pedersen et al.

(10) Patent No.: US 11,199,641 B2
(45) Date of Patent: Dec. 14, 2021

(54) SEISMIC MODELING

(71) Applicant: Equinor Energy AS, Stavanger (NO)

(72) Inventors: Ørjan Pedersen, Ranheim (NO); Frank Agnar Maaø, Trondheim (NO); Lasse Amundsen, Trondheim (NO)

(73) Assignee: EQUINOR ENERGY AS, Stavanger (NO)

( * ) Notice: Subject to any disclaimer, the term of this patent is extended or adjusted under 35 U.S.C. 154(b) by 246 days.

(21) Appl. No.: 16/338,651

(22) PCT Filed: Oct. 2, 2017

(86) PCT No.: PCT/NO2017/050255
§ 371 (c)(1),
(2) Date: Apr. 1, 2019

(87) PCT Pub. No.: WO2018/067014
PCT Pub. Date: Apr. 12, 2018

(65) Prior Publication Data
US 2020/0041675 A1 Feb. 6, 2020

(30) Foreign Application Priority Data
Oct. 4, 2016 (GB) .................................. 1616867

(51) Int. Cl.
*G01V 1/28* (2006.01)
*G01V 99/00* (2009.01)

(52) U.S. Cl.
CPC .............. *G01V 1/282* (2013.01); *G01V 1/284* (2013.01); *G01V 99/005* (2013.01)

(58) Field of Classification Search
CPC .................. G01V 1/282; G01V 1/284; G01V 2210/6242; G01V 2210/67;
(Continued)

(56) References Cited

U.S. PATENT DOCUMENTS

| 8,437,219 | B2 | 5/2013 | Chapman et al. |
| 2001/0110018 | | 6/2003 | Dutta et al. |
| 2009/0006054 | A1 | 1/2009 | Song |

FOREIGN PATENT DOCUMENTS

| CN | 104122585 A | 10/2014 |
| WO | 2016108896 A1 | 7/2016 |
| WO | 2017119912 A1 | 7/2017 |

OTHER PUBLICATIONS

Gurevich et al., Poroelastic Effect on the Shear Wave in the Systems of Alternating Solid and Viscous Fluid Layers: Theory vs Numerical Modeling, Nov. 6-11, 2005, 2005 SEG Annual Meeting, 5 pp. (Year: 2005).*

(Continued)

*Primary Examiner* — Toan M Le
(74) *Attorney, Agent, or Firm* — Eversheds Sutherland (US) LLP

(57) ABSTRACT

A method of seismic modeling using an elastic model, the elastic model including a grid having a grid spacing sized such that, when synthetic seismic data is generated using the elastic model, synthetic shear wave data exhibits numerical dispersion, the method including: generating generated synthetic seismic data using the elastic model, wherein the generated synthetic seismic data includes synthetic compression wave data and synthetic shear wave data, and modifying the generated synthetic seismic data to produce modified synthetic seismic data by attenuating at least some of the synthetic shear wave data in order to attenuate at least some of the numerically dispersive data.

18 Claims, 1 Drawing Sheet

(58) Field of Classification Search
CPC ..... G01V 2210/673; G01V 2210/6161; G01V 2210/66; G01V 2210/614; G01V 2210/50; G01V 99/005
See application file for complete search history.

(56) References Cited

OTHER PUBLICATIONS

On_Petro_Search_Results, Mar. 15, 2021, 1 pp. (Year: 2021).*
Chapman, C.H., et al., Correcting an acoustic wavefield for elastic effects, Geophysical Journal International (2014) 197, 1196-1214, Mar. 22, 2014 (19 pp.).
Chapman, C., et al., Elastic corrections to acoustic finite-difference simulations, SEG Denver 2010 Annual Meeting, 3013-3017, 2010 (5 pp.).
Hobro, J.W.D., et al., Elastic Corrections to Acoustic Finite-difference Simulations—Plane-Wave Analysis and Examples, 73rd EAGE Conference & Exhibition incorporations SPE EUROPEC 2011, Vienna, Austria, May 23-26, 2011 (5 pp.).
Moczo, Peter, et al., The Finite-Difference Time-Domain Method for Modeling of Seismic Wave Propagation, Advances in Geophysics, vol. 48, 421-516, DOI10.1016/30065-2687(06)48008-0, Elsevier—Academic Press, 2007 (106 pp.).
Virieu, Jean, P-SV wave propagation in heterogeneous media: Velocity-stress finite-difference method, Geophysics, vol. 51, No. 4, Apr. 1986, 889-901 (13 pp.).
International Search Report and Written Opinion, PCT/NO2017/050255, dated Dec. 18, 2017 (11 pp.).
GB1616867.6 Search Report, dated Mar. 24, 2017 (4 pp.).
Yang, D., et al., Symplectic stereomodelling method for solving elastic wave equations in porous media, Geophysical Journal International, vol. 196, 2014 (https://academic.oup.com/gji/articlelookup/doi/10.1093/gji/ggt393), pp. 560-579 (20 pp.).

* cited by examiner

SEISMIC MODELING

TECHNICAL FIELD

The invention relates to a method of seismic modeling, particularly a method of seismic modeling using an elastic model.

BACKGROUND OF THE INVENTION

Seismic modeling of wave propagation is the backbone of many high-end seismic processing algorithms such as amplitude-versus-offset (AVO) analysis and imaging and inversion of seismic data. Another purpose of modeling is also to validate geological models by comparing modeled synthetic data to the data acquired in the field. However, the real physics of the Earth's interior exceeds the capacity to model seismic experiments where the objective is to model the Earth's true response to applied seismic sources. It is difficult to model data that honors all or as much as possible of the physics of the Earth.

In the prior art, methods have been developed that include approaches ranging from simple acoustic models to complex an-elastic anisotropic models. The modeling methods are based on mathematical tools such as finite-difference (FD) or finite-element (FE), but they are computationally intensive and much effort is required to make them efficient. In some cases, like for Reverse Time Migration (RTM) and Full Waveform Inversion (FWI) as much as 80-90% of the compute time is spent on generating synthetic data by modeling. Seismic modeling is therefore an area of significant research in the industry. Indeed, these processes are amongst the most computationally intensive processes performed anywhere in the world today.

In the seismic industry, synthetic data is typically generated in a model using a time-marching algorithm, such FD or FE methods. The most commonly used method for simulating wave propagation is the FD method. The basic wave equations can be formulated in various formally equivalent ways. Due to the versatility and stability of the FD method, it is by far the most popular method over the last several decades for wavefield computations. Details of the FD method is given by Moczo et al. (2007) and Robertsson and Blanch (2011).

One type of model used to model the Earth's interior, whilst attempting to improve the efficiency (i.e. reduce the computational intensity), is an acoustic model. Acoustic models are scalar models in which the modeled wavefield is simulated by solving the acoustic wave equation by making a velocity model that depends on the compressional wave velocities (i.e. and not shear wave velocities), possibly with velocity anisotropy parameters included. In acoustic modeling, the acoustic wave equation is solved by, for example, using the FD method which approximates derivatives between neighboring points in a grid. For this purpose, the velocity model is discretized into a number of grid points and the wavefield is calculated at each grid point as function of time.

Acoustic modeling is used because it reduces computational intensity of the method, since it is a vastly simplified model of the physics of the Earth's interior. However, also because it is such a simplified model, acoustic modeling is not very representative for modeling the wavefield in an elastic earth. This problem is particularly acute when trying to accurately model reflectivity and reflection coefficients.

In order to better model the physics of the Earth's interior, an elastic model of the Earth's interior has been proposed in the prior art. Using an elastic model can, in particular, greatly improve the accuracy of the model's ability to model amplitudes, reflectivity and reflection coefficients.

However, since elastic properties of the Earth are included in this model, it can become very computationally intensive. In comparison to acoustic modeling, elastic modeling is more computationally intensive for several reasons. For instance, there are more field variables and more model parameters in an elastic model than in an acoustic model.

The main reason why elastic modeling is more computationally intensive than acoustic modeling stems from the fact that both shear waves and compression waves are produced in an elastic model, whilst only compression waves are produced in an acoustic model. The reason why this increases the required computation is set out below.

Two basic numerical properties of a time-marching method, such as the FD method, are stability and numerical dispersion.

Regarding the stability of the model, the time marching introduces a stability condition. If this stability condition is not met, then errors in the time-marching method may occur. For instance, the so-called Courant-Friedrich-Levy (CFL) stability condition prescribes that the maximum size of the time step $\Delta t$ for 3D simulations is:

$$\Delta t < \frac{\Delta x}{\sqrt{3}\, c_{max}} \quad (1)$$

where $\Delta x$ is the grid spacing of the model and $c_{max}$ is the maximum wave propagation speed in the medium.

Regarding the numerical dispersion, numerical dispersion is defined as the effect when different frequencies of the wavefields propagate slower or faster compared to the correct speed of wave propagation in the medium, i.e. when certain frequencies of the modeled wavefield propagate through the model at incorrect speeds.

The numerical dispersion is dominated by the slowest wave speed $c_{min}$ in the medium, which is where the wavelength is the shortest. The number of sampling points (or grid points) in the model per wavelength necessary for a certain level of accuracy is determined by the chosen time-marching scheme and the slowest wave speed in a medium. Thus, in order to avoid numerical dispersion, the maximum possible grid spacing in the model is limited by the slowest wave speed. If the grid spacing is increased beyond this maximum limit, then numerical dispersion errors occur in the data.

In order to reduce computational requirements (e.g. increase the computational efficiency), it is desirable to have a model with as large a grid spacing as possible, and to have as large a time-step as possible, since this would reduce the number of calculations needed. As is clear from the above, the slowest wave speed limits the maximum grid size (due to numerical dispersion) and hence also limits the maximum time step (due to stability).

In acoustic models, the slowest wave speed is still relatively high, since only compression waves are produced in acoustic models. For instance, the slowest wave speed may be the acoustic water speed, which is around 1500 m/s. Since the slowest wave speed is still relatively high, the grid spacing and time stepping in an acoustic model can be relatively large and hence computational efficiency can be relatively high.

In elastic models, the elastic wave equation is solved by making a velocity model that depends the compressional wave velocities (and anisotropy parameters), similarly to the acoustic model. However, in elastic models the elastic wave equation is also solved by making the velocity model depend on the shear wave velocities, which is not done in the acoustic model.

The slowest shear wave velocities are always slower than the slowest compression wave velocities. This occurs because the shear wavelength can become very small compared to the compressional wavelength. For instance, the most the shear wave velocity can be is $1/\sqrt{2}$ of the compressional velocity. However, in certain regions of the Earth the shear wave velocity can be very slow in comparison to the compression wave velocity. For instance, in the near-surface below the seafloor, the shear wave velocity can be as slow as around 50-100 m/s whereas the compressional velocity is around 1500 m/s.

Since the elastic models comprise shear waves that have a slower velocity than compression waves, whereas acoustic models do not produce shear waves; and since the slowest velocity waves limit the maximum possible grid spacing and time stepping of the model, the maximum possible grid spacing and time spacing in an elastic model is smaller than the maximum possible grid spacing and time spacing in an acoustic model. Since the grid spacing and time stepping define the computational requirements to produce synthetic seismic data using the model, elastic models are more computationally intensive than acoustic models.

For instance, when comparing a 3D acoustic model with a 3D elastic model, if the spatial step in elastic modeling is reduced by a factor n compared to acoustic modeling, then a factor $n^3$ more grid points are required in 3D simulations. In addition to another factor n more time steps are required, Therefore, there is an increase of a factor $n^4$ in the number of computations required.

Thus, even with today's computing power, elastic modeling is challenging, particularly in 3D. Typically, an elastic modeling method is around 10 to 1000 times more computationally intensive than an acoustic modeling method.

Computations with the acoustic wave equation are significantly simpler as they can be performed with coarser grids, both in space and time. In addition they require less memory. The challenge is that the acoustic wave amplitudes do not represent the amplitudes of recorded seismic data well. Further, the acoustic models do not accurately model reflection coefficients or reflectivity.

In Chapman et al. (2010, 2014), the authors were aware of the above limitations of both elastic and acoustic models. In order to improve the known limitations of the known models, the authors proposed a method of seismic modeling using an acoustic model. In the method, some elastic effects were mimicked in the acoustic model. This was achieved by introducing secondary sources aimed at improving the amplitudes of the compressional waves in the acoustic model. The benefit of their solution is that, in comparison to elastic modeling, it is less computationally intensive; and, in comparison to standard acoustic modeling, the amplitude of the compression waves are more accurate. Hobro et al. (2011) showed that their correction gave good agreement with a full elastic simulation, provided that the velocity contrasts in the model was low.

Whilst Chapman et al. (2010, 2014) offers an improvement in accuracy over typical acoustic models, it is still uses an acoustic model and merely artificially mimics elastic effects. There is therefore a desire for an improved method of seismic modeling.

SUMMARY OF THE INVENTION

In a first aspect the present invention provides, a method of seismic modeling using an elastic model, the elastic model comprising a grid having a grid spacing sized such that, when synthetic seismic data is generated using the elastic model, synthetic shear wave data comprises (or displays or exhibits) numerical dispersion, the method comprising: generating generated synthetic seismic data using said elastic model, wherein the generated synthetic seismic data comprises synthetic compression wave data and synthetic shear wave data; and modifying the generated synthetic seismic data by attenuating at least some of the synthetic shear wave data to produce modified synthetic seismic data.

This method allows an elastic model to be used. This is advantageous as the seismic data produced is more accurate than the seismic data produced using an acoustic model, such as in Chapman et al. (2010, 2014). Further, the present method allows an elastic model to be used whilst increasing the computational efficiency that is required to generate synthetic seismic data in the model. The present method can increase the required computational efficiency by around 10-1000 times.

The motivations behind Chapman et al. (2010, 2014) and the present invention are somewhat similar. Both generally aim to generate more accurate synthetic data, whilst maximising the computational efficiency. However, the present inventors have approached this problem completely differently to Chapman et al. (2010, 2014). In Chapman et al, (2010, 2014) an acoustic model is used, and second sources were introduced into the acoustic model to mimic elastic effects on the compression waves produced in the acoustic model. However, in stark contrast to the method set out in Chapman et al. (2010, 2014), the present inventors have used an elastic model, and have devised a way of using an elastic model whilst increasing the computational efficiency.

The computational efficiency has been increased in the present method because the grid spacing in the model has been increased above its conventional maximum limit. As has been discussed above, in the prior art the maximum grid spacing is selected such that there is no numerical dispersion of the generated shear waves. However, the present grid size is chosen to be larger than this, such that some of the shear wave data displays numerical dispersion. The numerical dispersion errors are removed or reduced by attenuating at least some of the synthetic shear wave data. This leaves (at least) synthetic compression wave data that has been generated using an elastic model. Since it has been generated using an elastic model, this synthetic compression wave data is more accurate than synthetic compression wave data from an acoustic model. However, since a larger grid spacing has been used, the synthetic compression wave data has been produced with a greater computational efficiency than would be required to produce synthetic compression wave data using a conventional elastic model.

Thus, the present method produces (at least) synthetic compression wave data, which is more accurate than synthetic compression wave data produced from an acoustic model, in a manner that is less computationally intensive than known elastic models.

In doing so, the present inventors have had to sacrifice at least some of the generated synthetic seismic shear wave data. However, the remaining compression wave data (and possibly the remaining portion of the shear wave data) is still useful in seismic modeling.

For instance, since it has been produced using an elastic model, rather than acoustic model, the synthetic seismic data can be used to accurately model reflections. An elastic model produces much more accurate reflection coefficients at interfaces than an acoustic model.

The present invention uses an elastic model. As has been discussed above, an elastic model is different to an acoustic model. An elastic model is a more complicated model of a geophysical structure than an acoustic model. In an elastic model, there are typically more field variables and more model parameters in an elastic model than in an acoustic model. For instance, in an isotropic acoustic model there may be only two parameters: density and acoustic velocity (which is equivalent to compression wave velocity); whereas in a corresponding elastic model there are three parameters: density, compression wave velocity and shear wave velocity. Further, in an elastic model, elastic parameters may be present, which are not present in an acoustic model.

The model of the present invention model may be a time-stepping model, such as a FD or a FE model. Thus, the generated seismic data may be produced using a time-stepping method, such as FD or FE.

The model of the present invention comprises a grid. The grid may be formed of a plurality of grid points, or sample points or cells, or other equivalent points. This grid has a grid spacing. A grid spacing may also be thought of as a sample spacing, or a grid size, or a grid cell size.

The elastic model may be an elastic model of a geophysical structure, e.g. a real geophysical structure in the Earth.

Computational efficiency may relate to the required memory, processing power, computing time, computational effort, computational resource(s) and/or total number of computations required to produce the generated synthetic data. A more computationally efficient process is less computationally intensive, i.e. it requires less memory, processing power, computing time, computational effort, computational resource(s) and/or total number of computations.

The method comprises generating generated synthetic seismic data. This may be also thought of as modeled seismic data, seismic wavefield(s) or seismic energy. Since the generated synthetic seismic data is generated in the elastic model of the present invention, the generated synthetic seismic data comprises both a shear wave component and a compression wave component.

The generated synthetic seismic data is produced in the model by inputting one or more sources into the model. The or each source may be a source of seismic energy. Thus, the model may comprise one or more sources.

The model may comprise one or more edges. The edges may be damped or absorbing edges so that artificial reflections in the model from the edges are avoided.

The generated synthetic seismic data is produced by allowing the model to run for a given time. The given time may be sufficient for the synthetic data to be generated from the source(s) to the edge(s) of the model. The given time may be sufficient for the synthetic data to be generated throughout the model.

Generating generated synthetic seismic data may comprise calculating the generated synthetic seismic data at the plurality of grid points (preferably each and every grid point of the model). This may be done over time. This may occur at time intervals governed by the time step size of the model.

The grid spacing may be greater than 0.1 m, greater than 0.5 m, greater than 1 m, greater than 5 m, greater than 10 m, greater than 50 m or greater than 100 m. The grid spacing may be less than 100 m, less than 50 m, less than 10 m, less than 5 m, less than 1 m, less than 0.5 m or less than 0.1 m. The grid spacing may be between 0.1-100 m, 0.5-100 m, 1-100 m, 5-100 m, 10-100 m, 50-100 m, 0.1-50 m, 0.5-50 m, 1-50 m, 5-50 m, 10-50 m, 0.1-10 m, 0.5-10 m, 1-10 m, 5-10 m or 0.1-5 m, 0.5-5 m, 1-5 m, 0.1-1 m, 0.5-1 m, or 0.5-0.1 m.

The grid spacing may be increased, in comparison to a conventional grid (for the same model) whose grid spacing is selected based on the slowest shear wave, by at least 1.5, 2, 5, 10, 20, 50 or 100 times, preferably between 2-20 times, preferably 5-15 times, preferably around 10 times. Doubling the spacing increases the efficiency by a factor of around 16; increasing the spacing by a factor of 10 increases the efficiency of a factor of around 10,000, as explained above.

Attenuating at least some of the generated synthetic shear wave data may comprise removing or deleting or muting or at least decreasing in amplitude the at least some of the generated synthetic shear wave data. The synthetic shear wave data that is attenuated may be only the synthetic shear waves that have undergone numerical dispersion (e.g. those with a velocity slow enough (and a short enough wavelength) to have undergone numerical dispersion).

The method may comprise summing the synthetic data at the plurality of grid points at the plurality of times. The attenuation step may occur before this summing step. In this case, it is the modified synthetic data that is summed.

The grid spacing may be sized such that, when synthetic seismic data is generated using the elastic model, synthetic shear wave data comprises numerical dispersion and substantially all of the synthetic compression wave data comprises no numerical dispersion. The grid spacing may be sized to be as large as possible without substantially any of the synthetic compression wave data comprising numerical dispersion.

The grid spacing may be sized such that the slowest compression wave data is the slowest wave that undergoes substantially no numerical dispersion in the model, i.e. any synthetic seismic waves with velocities slower than the slowest compression wave would undergo dispersion.

Preferably the synthetic compression wave data comprises absolutely no numerical dispersion. However, in reality this may be difficult or impossible to achieve. This is why the terms "substantially all", "substantially any" and "substantially no" have been used above. There may be some small, negligible level of numerical dispersion in the synthetic compression wave data, but the grid size may be small enough such that there is either absolutely no numerical dispersion in the compression wave data or such that any numerical dispersion in the compression wave data is a minor portion of the compression wave data that does not unduly affect the accuracy of the synthetic compression wave data.

The grid spacing may be uniform throughout the model, or may vary at different locations in the mode. The grid spacing in a first direction (such as the horizontal x-direction) may be uniform or may vary along that direction; the grid spacing in a second direction (such as the horizontal y-direction) may be uniform or may vary along that direction; and/or the grid spacing in a third direction (such as the vertical z-direction) may be uniform or may vary along that direction. For instance, the grid spacing may change when the model parameters change (e.g. when compression wave velocity changes in the model the maximum grid spacing to avoid dispersion of compression waves may be larger in some locations than in others).

Additionally/alternatively, the grid spacing in a first direction (such as the horizontal x-direction) may be different to and/or the same as the grid spacing in a second direction (such as the horizontal y-direction). The grid spacing in a first direction (such as the horizontal x-direction) may be different to and/or the same as the grid spacing in a third direction (such as the vertical z-direction). The grid spacing in a second direction (such as the horizontal y-direction) may be different to and/or the same as the grid spacing in a third direction (such as the vertical z-direction). The first, second and third directions may be mutually perpendicular to each other.

The method may comprise selecting the grid spacing of the model. This selection may be based on the slowest compression wave velocity. The grid spacing may be selected to reach the above-discussed grid spacing size.

Having an elastic model with such a grid size, allows the grid size of the elastic model of the present invention to be much larger than the grid size of a conventional elastic model. Indeed, this grid size is closer to the grid size of an acoustic model. This can increase computational efficiency by around 10-1000 times.

The model may comprise a time step. As has been discussed above, a time step is the amount of time that elapses between subsequent calculations of the generated synthetic seismic data when generated synthetic seismic data is generated using the model.

The time step may be sized such that, when generated synthetic seismic data is generated using the elastic model, the generated synthetic seismic data is, at least substantially, stable. This may be achieved by ensuring that the time step meets the requirement of the stability condition of the model, such as the CFL stability condition (equation 1).

The method may comprise selecting the time step of the model. This selection may be based on the grid spacing, which in turn may be based on the slowest compression wave velocity. Thus, the time step may be selected based on the slowest compression wave velocity. The time step may be selected to ensure the generated synthetic seismic data is stable. The time step may be uniform throughout the model, or may vary at different locations in the mode. The time spacing for a given location may depend on the grid spacing at that location (e.g. as is clear from equation 1). Thus, if there are larger grid spacings at certain locations, then there may be larger time steps here; and if there are smaller grid spacings at other locations, then there may be smaller time steps here. However, in a simpler model, the time steps may be uniform for each location in the model, and are selected so as to avoid instability.

The time step may be greater than 0.01 ms, greater than 0.1 ms, greater than 1 ms, greater than 10 ms or greater than 100 ms. The time step may be less than 100 ms, less than 10 ms, less than 1 ms, less than 0.1 ms or less than 0.01 m. The time step may be between 0.01-100 ms, 0.1-100 ms, 1-100 ms, 10-100 ms, 0.01-10 ms, 0.1-10 ms, 1-10 ms, 0.01-1 ms, 0.1-1 ms or 0.01-0.1 ms.

The time spacing may be increased, in comparison to a conventional grid (for the same model) whose grid spacing is selected based on the slowest shear wave, by at least 1.5, 2, 5, 10, 20, 50 or 100 times, preferably between 2-20 times, preferably around 10 times.

The generated synthetic shear wave data generated in the model may comprise (or consist of) a first portion consisting of data that comprises (or displays or exhibits) numerical dispersion and a second portion consisting of data that comprises (or displays or exhibits) no numerical dispersion. The method may comprise attenuating at least some of the first portion. Whilst some of the second portion may also be attenuated, preferably only at least some of the first portion is attenuated. The entire first portion may be attenuated.

Stated another way, some of or all of the numerically dispersive data may be attenuated. Some of or none of the non-numerically dispersive data may be attenuated.

The generated synthetic seismic data comprises synthetic shear wave data and synthetic compression wave data. The synthetic shear wave data may consist of a first portion that displays numerical dispersion and a second portion that does not display numerical dispersion. The first portion may be attenuated. The first portion only may be attenuated. The first portion and some of the second portion may be attenuated. Both portions (e.g. substantially all of the shear wave data) may be attenuated. Preferably, substantially none of the synthetic compression wave data is attenuated.

Regarding the generated syndetic seismic data, the slowest shear wave velocity may always be slower than the slowest compression wave velocities. This may occur because the shear wavelength can become very small compared to the compressional wavelength. For instance, the most the shear wave velocity can be is $1/\sqrt{2}$ of the compressional velocity. However, in certain regions of the Earth the shear wave velocity can be very slow in comparison to the compression wave velocity. For instance, in the near-surface below the seafloor, the shear wave velocity can be as slow as around 50-100 m/s whereas the compressional velocity is around 1500 m/s. Thus, the generated shear wave data may have a shear wave velocity that is less than or equal to $1/\sqrt{2}$ of the compression wave velocity, or less than or equal to ½ of the compression wave velocity, less than or equal to ⅕ of the compression wave velocity, or less than or equal to 1/10 of the compression wave velocity, or less than or equal to 1/20 of the compression wave velocity.

Attenuating at least some of the generated synthetic shear wave data may comprise applying one or more filters to the generated synthetic seismic data. Preferably, a plurality of filters are applied to the generated synthetic seismic data. The filter(s) may be applied to the generated synthetic seismic data at each grid point. The filter(s) may be applied to the generated synthetic seismic data at each grid point at each time interval.

The or each filter may be spatial filter.

The filter(s) may be applied to the generated synthetic seismic data before the data from each grid point, and preferably each time step, is summed. It may therefore be the modified synthetic seismic data that is summed.

A specific filter may be applied to data at each grid point and/or time point, i.e. there may be a specific filter associated with each grid point and/or time point. Some of these filters may be the same as one another, and some may be different, depending on their respective grid points, time points, the data generated at their respective locations and/or the parameters (or physics) of the model at their respective locations. The specific form of a specific filter for a specific grid point may depend on the medium parameters of the model at that specific grid point. The specific form of a specific filter may also depend on the frequency of the synthetic seismic data to which it is applied.

The specific filter applied to data at a specific grid point may itself be made up of a plurality of different filters, as is mentioned below with relation to the filter $F_{ij}$.

The method may comprise selecting or designing the one or more filters so as to attenuate or eliminate the desired synthetic shear wave data (e.g. the numerically dispersive portion of the generated synthetic seismic data, or the entirety of the synthetic shear wave data). The method may comprise selecting or designing the one or more filters so as to preserve at least some of the synthetic compression wave data, and preferably substantially all of the synthetic compression wave data.

The one or more filters are applied to the generated synthetic seismic data and may attenuate or eliminate the synthetic dispersive shear wavefield. However, the one or more filter may preserve the synthetic compression wave data.

The or each filter may contain (or consist of) two parts. The first part may remove the numerically dispersive data (e.g. the high wavenumber energy in the wavefields). The second part may separate the compression wave and shear wave components of the data, preferably the compression wave and shear wave components of the modified data. The separation may be used to remove the shear wave component (i.e. any remaining shear wave data that is left after the numerically dispersive data is removed) from the compression wave component, and hence isolate the compression wave component Viewed in another way, $d_i$ may represent the generated synthetic seismic data for a given grid point and time step. This data $d_i$ may include particle velocities (which may be in three dimensions when in a 3D model; two dimensions when in a 2D model; or one dimension when in a 1D model) and may include stresses (which may include nine components, though possibly fewer if there is some isotropy in the model, or if the model is not a 3D model). Thus, there may be up to twelve components in $d_i$, though possibly fewer if there is some isotropy in the model, or if the model is not a 3D model. Thus, it is possible for i=1, . . . , 12. Generally, at every location in the grid, e.g. (x, y, z) for a 3D model, a local filter $F_{ij}$ is applied to the data $d_i$ at that point. The filter $F_{ij}$ may actually also be thought of as being made up of a plurality of filters. Applying the filter $F_{ij}$ to the generated synthetic data $d_i$ produces the modified data $D_i$:

$$D_i = F_{ij} d_j \qquad (2)$$

The filter $F_{ij}$ may be chosen such that the modified data $D_i$ may contain little or no dispersive shear waves. The modified data $D_i$ may be summed. The, preferably summed, modified data $D_i$ may be used in further seismic processing, such as AVO analysis, RTM or FWI, as is discussed below. Some examples of the possible filters $F_{ij}$ are discussed in detail below.

The elastic model may be a 1D or 2D elastic model, but is preferably a 3D elastic model. The effects of low computational efficiency associated with typical elastic modeling become more severe as the number of dimensions in the model increases, since the number of grid points increases. 3D elastic models give the best representation of the Earth's physics.

The elastic model may be an isotropic elastic model, i.e. a model with substantially no anisotropy. This may be beneficial as it simplifies the calculations since the number of model parameters are reduced in comparison to anisotropic models. This may simplify the generated synthetic seismic data and may simplify the filter(s) and may simplify the modified synthetic seismic data. For instance, in an isotropic elastic model there may be only three parameters: density, compression wave velocity and shear wave velocity; whereas in an anisotropic model there may be more parameters (up to twenty-two parameters for general anisotropy and between three and twenty-two for partial anisotropy). However, isotropic models may not provide the most accurate synthetic data.

Additionally or alternatively, the elastic model may be an anisotropic elastic model. The anisotropic model may be one with at least one element of anisotropy. The anisotropy may be partial, or may be general (i.e. complete anisotropy). The anisotropic elastic model may be a transverse isotropic model.

A model may be both anisotropic and isotropic as it may have an isotropic region and an anisotropic region. Alternatively, the model may be purely isotropic or purely anisotropic.

Using an anisotropic model may be beneficial as it may provide more accurate synthetic data than isotropic models. However, it may be (much) more computationally intensive (i.e. less computationally efficient) than using isotropic models. This arises because, as set out above, there are more parameters included in an anisotropic model. This decreased computational efficiency when using an anisotropic model makes the present invention's effect of increasing the computational efficiency all the more important.

The model may comprise at least one location where reflections in the (generated and/or modified) synthetic seismic data may occur. Such a location may be an interface between two regions where the model parameters change such that a reflection occurs when generated synthetic seismic data is generated. The location may be surface or a plane (e.g. a 2D "location" in a 3D model), or a line (e.g. a 1D location in a 2D or 3D model). There may be a plurality of such locations.

The method may comprise obtaining (e.g. generating, finding, calculating or determining) one or more reflection coefficients for the reflection location. The reflection coefficients may be obtained from the model parameters. For instance, where density or velocity parameters change in the model, there may be a reflection coefficient associated with this change. The reflection coefficient(s) can be found from the parameters of the model.

The reflection coefficients may be obtained in a separate or independent method step. For instance, the reflection coefficients may be calculated from the parameters. However, the reflection coefficients may not be obtained in a separate or independent method step. For instance, when the wave equation is run in the model, the reflection coefficients may be accounted for simply in the way the wave propagates through the model according to the model parameters.

The method may comprise using said one or more reflection coefficients when generating the generated synthetic seismic data. This helps to produce more accurate reflections in the generated synthetic seismic data, and hence more accurate generated syndetic seismic data as a whole.

Since the model is an elastic model, the parameters used in the model more accurately describe the real geophysical structure, and hence the obtained reflection coefficients are more accurate than for an acoustic model. Thus, the reflections in the generated synthetic seismic data and hence the generated synthetic seismic data as a whole is more accurate than for an acoustic model.

The reflection coefficients may be found for all of the generated synthetic seismic data, or may be found only for the portion of the generated synthetic seismic data that is not to be (or is not) attenuated (e.g. the non-numerically dispersive portion, such as the compression wave data).

Using such an elastic model and the present invention therefore allows the synthetic compression seismic data (at least) to be more accurately modeled compared to when using an acoustic model, whilst avoiding (or at least reducing) the extremely high computational requirements for typical elastic modeling.

In a second aspect, the invention comprises a method of seismic processing using the modified data from the method of the first aspect.

The elastic model may be an elastic model of a geophysical structure, e.g. a real geophysical structure in the Earth, such a subsurface geophysical structure. Measured seismic data acquired from the geophysical structure may be provided. The method may comprise: using said measured seismic data and the generated synthetic seismic data to update a model to produce an updated model that more accurately represents of the geophysical structure. Using said measured seismic data and the modified seismic data may comprise comparing said measured seismic data with the generated synthetic seismic data and/or the modified synthetic seismic data. The model that is updated based upon the comparison may be a reflectivity model and/or the elastic model on which the generated geophysical data is generated. The update may be performed using a migration calculation, such as reverse time migration (RTM) and/or least squares migration (LSM).

In more detail, this method may comprise comparing the generated synthetic seismic data with the measured data, to produce differential data. This differential data may then be propagated to depth in the model. The propagated differential data may then be filtered to obtain an update direction for the model (e.g. an update direction for the model parameter(s)) and to obtain an update scale for the model (e.g. a scale/factor for the update of the model parameter(s) in the update direction(s)). The update direction and update scale can then be used to produce the updated model. This updated model can then be used to produce new generated synthetic seismic data and the process can begin again.

Preferably the measured seismic data that is provided is the equivalent seismic data to the modified seismic data, e.g. compression wave data, and possible the non-attenuated portion of the shear wave data (e.g. the portion of the shear wave data that has a velocity high enough such that it was non-dispersive in the model and hence not attenuated).

The method of seismic processing may comprise producing an elastic model, or updating the elastic model. This may be achieved by performing FWI and/or RTM and/or AVO analysis, or other seismic processing methods, using the modified synthetic seismic data. The elastic model produced or updated may have any of the features of the model described in the first aspect.

The method may comprise repeating the steps of generating generated synthetic seismic data (using said updated model) and using the generated synthetic seismic data and the measured seismic data (which may preferably be the same measured seismic data) to produce a new updated model. This repetition may be performed a plurality of times, preferably many times (such as at least 10, 100, 1000, 10,000, 100,000 or 1,000,000 times), to produce an accurate model as possible. The repetition may be an iterative process.

The method may comprise acquiring the measured seismic data from the geophysical structure. This may be achieved using any known suitable seismic data acquisition technique.

The measured seismic data may be (or may have been) measured using receivers in located in the sea or on the sea bed. When located in such locations, generally only compression waves are measured since shear waves to not propagate through water.

In a third aspect, the invention provides a computer program product comprising computer readable instructions that, when run on a computer, is configured to perform any of the methods of the first and/or second aspects.

In a fourth aspect, the invention provides a method of prospecting for hydrocarbons. This method comprises performing any of the methods of the first and/or second aspects, possibly using the computer program product of the third or seventh aspects. This method may also comprise using the seismic model described in the first, second and/or sixth aspect to prospect for hydrocarbons.

Using the model may comprise identifying locations for drilling and/or identifying well locations using the model. The method may comprise drilling at and/or into said identified locations.

In a fifth aspect, the invention the invention provides a method of producing hydrocarbons. The method may comprise performing any of the methods of the first, second and/or fourth aspects, and producing hydrocarbons through the drilled wells.

In a sixth aspect, the invention provides a seismic model, wherein the seismic model is an elastic model, the elastic model comprising a grid having a grid spacing sized such that, when synthetic seismic data is generated using the elastic model, synthetic shear wave data comprises numerical dispersion.

Preferably, the grid spacing is sized such that, when synthetic seismic data is generated using the elastic model, synthetic shear wave data comprises numerical dispersion and substantially all of the synthetic compression wave data comprises no numerical dispersion.

Preferably, the grid spacing is sized to be as large as possible without substantially any of the synthetic compression wave data comprising numerical dispersion.

The seismic model may comprise any of the features, or may be able to perform any of the methods, discussed in relation to the seismic model in the first aspect, the second aspect or any other aspect of the invention.

In a seventh aspect, the invention provides a computer program product comprising the seismic model of the sixth aspect. The computer program product may comprise computer-readable instructions such that, when run it is on a computer, the computer generates, calculates or otherwise displays the model.

It should be understood that in the art compression waves are often called "P-waves" and shear waves are often called "S-waves".

BRIEF DESCRIPTION OF THE DRAWINGS

Certain preferred embodiments will now be described by way of example only and with reference to the accompanying drawings, in which.

DETAILED DESCRIPTION

Figure 1A:
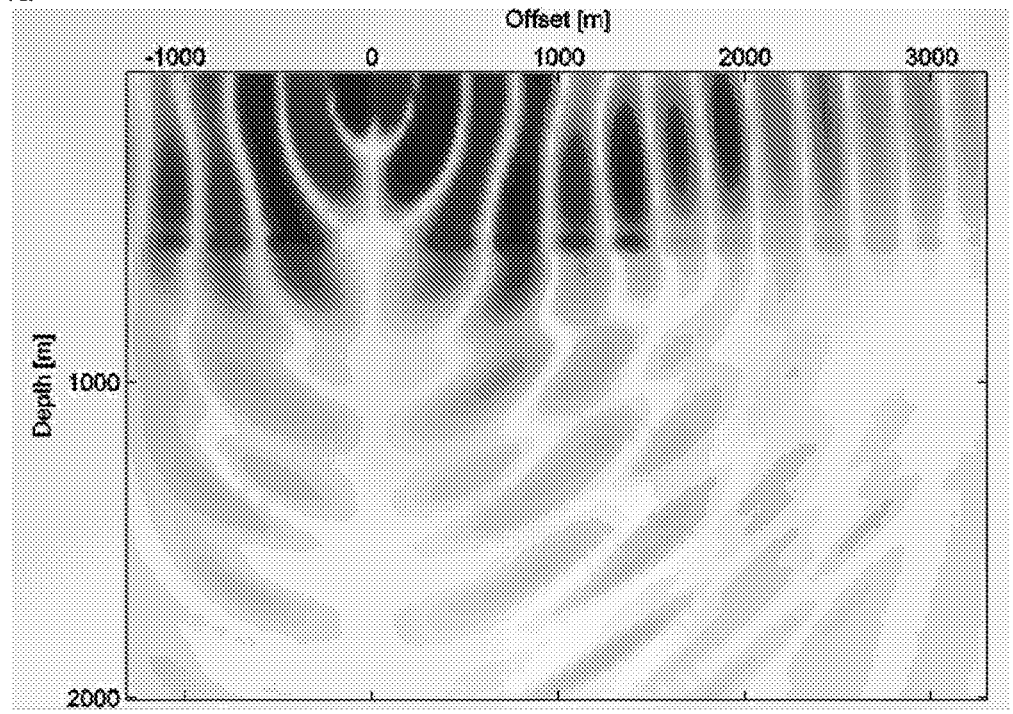
FIG. 1 shows exemplary data produced using a model according to an embodiment of the present invention.

One embodiment of the present invention may involve performing 3D elastic FD simulations of seismic data using a 3D elastic model. These simulations can then be used for further seismic processing. As mentioned below, this model may be isotropic or anisotropic. As should be clear from the above description, the present invention could be performed using any elastic model, e.g. 1D, 2D or 3D with any time-marching algorithm.

The inventors have observed that it is computationally challenging to perform elastic simulations when the shear wave velocities are low, particularly 3D elastic simulations, particularly 3D elastic anisotropic simulations, as the computational requirements become very high, as has been discussed in detail above. The inventors solution to this challenge is to approximate the elastic simulation not by using an equivalent acoustic model (such as done by Chapman et al. (2010, 2014)) but rather by defining the grid based on the lowest acoustic (e.g. compression wave) wave velocity. Basing the grid on the lowest acoustic wave velocity means selecting a grid size that is only just small enough to ensure the acoustic waves display no numerical dispersion. Compared to standard elastic FD modeling, the number of grid points in the model using this approach can be significantly reduced, since in standard elastic modeling the grid is based on the slowest shear wave velocity which is slower than the slowest acoustic wave velocity. Increasing the grid size in this way significantly reduces the memory and compute time required (i.e. the computational efficiency is increased).

However, using such a large grid spacing is not done in the prior art since the modeled shear waves can become dispersive, which is an unwanted effect. In order to address this problem, the inventors have developed a method where filters are applied to the modeled wavefields that attenuates or eliminates the modeled dispersive shear wavefield. Thus, some of the generated modeled wavefield is attenuated or eliminated. In the prior art, there is no attenuation or removal of modeled wavefields. This step may have the disadvantage of actually reducing the amount of data (e.g. the shear wave data may be attenuated or eliminated). However, it does mean that the compression wave data (that is preserved, i.e. not attenuated) is elastic compression wave data and hence is more accurate than, for instance, acoustic modeled compression wave data. Thus, amongst other effects, the invention allows for accurate elastic modeling of compression wave data whilst avoiding the large computational effort.

Regarding a mathematical description of the method, at each location of the grid $v_i$ (i=1, 2, 3) represents the three components of the modeled particle velocity field and $\sigma_{ij}$ (i, j=1, 2, 3) represents the components of the modeled stress field. In an embodiment of the invention, spatial filters are designed and are applied to the modeled data, before summing the filtered data, to attenuate shear wave energy while preserving compressional wave energy. These filters depend on the local medium parameters where they are applied to the modeled data as well as frequency.

At each grid location, $d_i$ represents the modeled synthetic data (e.g. particle velocities and stresses, which may total 12 components so that i=1, . . . , 12). Generally, at every location in the grid, say (x,y,z), local filters $F_{ij}$ are defined (or designed or selected) that are applied to the data $$D_i = F_{ij} d_j \quad (2)$$

The filters are chosen such that the new modified data $D_i$ contain little or no dispersive shear waves. The data $D_i$ can be used in further seismic processing, such as FWI and/or RTM and/or AVO analysis.

The filters $F_{ij}$ can contain (only) two parts. The first part removes the high wavenumber energy in the wavefields, while the second part separates the compression (P-wave) and shear (S-wave) components.

In some embodiments, the elastic model used is an isotropic model. An elastic isotropic model can be described by density $\rho$, compressional velocity $\alpha$ and shear velocity $\beta$, where velocities can depend on frequency $\omega$. The wavefield data $d_i$ that governs the wave propagation is $$d_i = (d_1, d_2, d_3, d_4, d_5, d_6) = (v_1, v_2, v_3, \sigma_{13}, \sigma_{23}, \sigma_{33}).$$

In an isotropic model, the 12 components of the data $d_i$ mentioned above may be reduced to six components due to symmetries and couplings in the model.

The filtered data $$D_i = (D_1, D_2, D_3, D_4, D_5, D_6) = (\tilde{v}_1, \tilde{v}_2, \tilde{v}_3, \tilde{\sigma}_{13}, \tilde{\sigma}_{23}, \tilde{\sigma}_{33})$$

is obtained from equation two. An example of the specific filters $F_{ij}$ (of which there are 36 components in this example, since i,j=0, . . . , 6) that can be used in this isotropic example are given below.

$$D_1 = \tilde{v}_1 = F_{11} v_1 + F_{12} v_2 + F_{13} v_3 + F_{14} \sigma_{13} + F_{15} \sigma_{23} + F_{16} \sigma_{33}$$

with filters $$F_{11} = -2\beta^2 \omega^{-2} \frac{d^2}{dx_1^2}; F_{12} = -2\beta^2 \omega^{-2} \frac{d^2}{dx_1 dx_2}; F_{16} = \frac{i}{\rho \omega} \frac{d}{dx_1}$$

$$F_{13} = F_{14} = F_{15} = 0$$

and $$D_2 = \tilde{v}_2 = F_{21} v_1 + F_{22} v_2 + F_{23} v_3 + F_{24} \sigma_{13} + F_{25} \sigma_{23} + F_{26} \sigma_{33}$$

with filters $$F_{21} = F_{12}; F_{22} = -2\beta^2 \omega^{-2} \frac{d^2}{dx_2^2}; F_{26} = \frac{i}{\rho \omega} \frac{d}{dx_2}$$

$$F_{23} = F_{24} = F_{25} = 0$$

and $$D_3 = \tilde{v}_3 = F_{31} v_1 + F_{32} v_2 + F_{33} v_3 + F_{34} \sigma_{13} + F_{35} \sigma_{23} + F_{36} \sigma_{33}$$

with filters $$F_{33} = 1 + 2\beta^2 \omega^{-2} \left( \frac{d^2}{dx_1^2} + \frac{d^2}{dx_2^2} \right); F_{34} = F_{16}; F_{35} = F_{26}$$

$$F_{31} = F_{32} = F_{36} = 0$$

and $$D_4 = \tilde{\sigma}_{13} = F_{41} v_1 + F_{42} v_2 + F_{43} v_3 + F_{44} \sigma_{13} + F_{45} \sigma_{23} + F_{46} \sigma_{33}$$

with filters $$F_{43} = \frac{2i\rho\beta^2}{\omega} \frac{d}{dx_1} \left( 1 + 2\beta^2 \omega^{-2} \left[ \frac{d^2}{dx_1^2} + \frac{d^2}{dx_2^2} \right] \right); F_{44} = F_{11}; F_{45} = F_{12}$$

$$F_{41} = F_{42} = F_{46} = 0$$

and $$D_5 = \tilde{\sigma}_{23} = F_{51} v_1 + F_{52} v_2 + F_{53} v_3 + F_{54} \sigma_{13} + F_{55} \sigma_{23} + F_{56} \sigma_{33}$$

with filters $$F_{53} = \frac{2i\rho\beta^2}{\omega}\frac{d}{dx_2}\left(1 + 2\beta^2\omega^{-2}\left[\frac{d^2}{dx_1^2} + \frac{d^2}{dx_2^2}\right]\right); F_{54} = F_{12}; F_{55} = F_{22}$$

$$F_{51} = F_{52} = F_{56} = 0$$

and $$D_6 = \tilde{\sigma}_{33} = F_{61}v_1 + F_{62}v_2 + F_{63}v_3 + F_{64}\sigma_{13} + F_{65}\sigma_{23} + F_{66}\sigma_{33}$$

with filters $$F_{61} = F_{43}; F_{62} = F_{53}; F_{66} = F_{33}; F_{63} = 0; F_{64} = 0; F_{65} = 0.$$

When these filters are applied to the modeled data $d_i$ at each location, the dispersive shear wave data is attenuated at each location to produce the modified data $D_i$. The modified data is summed and then can be used for further seismic processing. The modified data $D_i$, having been filtered, comprises non-dispersive stable compression wave data. In other embodiments, the elastic model used is an anisotropic model, such as a model with transverse isotropy. In geophysics, a common assumption is that the rock formations of the subsurface are locally polar anisotropic or transversely isotropic. Such models can be described by density $\rho$ and five independent stiffness parameters $C_{12}$, $C_{13}$, $C_{33}$, $C_{44}$, $C_{66}$, or by compressional velocity $\alpha$, shear velocity $\beta$, and Thomsen parameters $\varepsilon$, $\delta$, $\gamma$. The Thompson parameters are related to the stiffnesses as $$\varepsilon = \frac{C_{11} - C_{33}}{2C_{33}}$$

$$\delta = \frac{(C_{13} + C_{44})^2 - (C_{33} - C_{44})^2}{2C_{33}(C_{33} - C_{44})}$$

$$\gamma = \frac{C_{66} - C_{44}}{2C_{44}}$$

The wavefield data $d_i$ that governs the wave propagation is $$d_i = (d_1, d_2, d_3, d_4, d_5, d_6) = (v_1, v_2, v_3, \sigma_{13}, \sigma_{23}, \sigma_{33}).$$

Again, in a transverse isotropic model, the 12 components of the data $d_i$ mentioned above may be reduced to six components due to symmetries and couplings in the model.

The filtered data $$D_i = (D_1, D_2, D_3, D_4, D_5, D_6) = (\tilde{v}_1, \tilde{v}_2, \tilde{v}_3, \tilde{\sigma}_{13}, \tilde{\sigma}_{23}, \tilde{\sigma}_{33}).$$

is obtained from equation two. An example of the specific filters $F_{ij}$ that can be used in this anisoptropic (transverse isoptric) model such that the filtered summed data does not contain significant dispersive shear wave energy are given below.

To simplify notation, we write $$\begin{bmatrix} \tilde{v}_3 \\ \tilde{\sigma}_{13} \\ \tilde{\sigma}_{23} \end{bmatrix} = E \begin{bmatrix} F_{33} & F_{34} & F_{35} \\ F_{43} & F_{44} & F_{45} \\ F_{53} & F_{54} & F_{55} \end{bmatrix} \begin{bmatrix} v_3 \\ \sigma_{13} \\ \sigma_{23} \end{bmatrix}$$

and $$\begin{bmatrix} \tilde{\sigma}_{33} \\ \tilde{v}_1 \\ \tilde{v}_2 \end{bmatrix} = E \begin{bmatrix} F_{66} & F_{61} & F_{62} \\ F_{16} & F_{11} & F_{12} \\ F_{26} & F_{21} & F_{22} \end{bmatrix} \begin{bmatrix} v_3 \\ \sigma_{13} \\ \sigma_{23} \end{bmatrix}$$

where $$E = \frac{1}{\left(-C_{13}\omega^{-2}\left[\frac{d^2}{dx_1^2} + \frac{d^2}{dx_2^2}\right] + C_{33}qQ\right)Q - C_{44}(q+Q)\omega^{-2}\left[\frac{d^2}{dx_1^2} + \frac{d^2}{dx_2^2}\right]}$$

and $$Q = \frac{\rho + C_{11}\omega^{-2}\left[\frac{d^2}{dx_1^2} + \frac{d^2}{dx_2^2}\right] - C_{44}q^2}{(C_{13} + C_{44})q}$$

$$q = \frac{1}{\sqrt{2}}\sqrt{K_1 + \sqrt{K_1^2 - 4K_1}}$$

$$K_1 = \frac{\rho(C_{33} + C_{44}) - (C_{13}^2 - C_{11}C_{33} + 2C_{13}C_{44})\omega^{-2}\left[\frac{d^2}{dx_1^2} + \frac{d^2}{dx_2^2}\right]}{C_{33}C_{44}}$$

$$K_2 = -\frac{C_{11}\omega^{-2}\left[\frac{d^2}{dx_1^2} + \frac{d^2}{dx_2^2}\right] + \rho}{C_{33}}$$

$$K_3 = -\omega^{-2}\left[\frac{d^2}{dx_1^2} + \frac{d^2}{dx_2^2}\right] - \frac{\rho}{C_{44}}$$

$$C_{11} = C_{12} + 2C_{66}$$

Now the local filters can be expressed in terms of differential operators and pseudo-differential operators in the following way $$F_{33} = \left(-C_{13}\omega^{-2}\left[\frac{d^2}{dx_1^2} + \frac{d^2}{dx_2^2}\right] + C_{33}qQ\right)Q$$

$$F_{34} = \frac{iQ}{\omega}\frac{d}{dx_1}$$

$$F_{35} = \frac{iQ}{\omega}\frac{d}{dx_2}$$

$$F_{43} = C_{44}(q+Q)\left(-C_{13}\omega^{-2}\left[\frac{d^2}{dx_1^2} + \frac{d^2}{dx_2^2}\right] + C_{33}qQ\right)\frac{i}{\omega}\frac{d}{dx_1}$$

$$F_{44} = -C_{44}(q+Q)\omega^{-2}\frac{d^2}{dx_1^2}$$

$$F_{45} = -C_{44}(q+Q)\omega^{-2}\frac{d^2}{dx_1 dx_2}$$

$$F_{53} = C_{44}(q+Q)\left(-C_{13}\omega^{-2}\left[\frac{d^2}{dx_1^2} + \frac{d^2}{dx_2^2}\right] + C_{33}qQ\right)\frac{i}{\omega}\frac{d}{dx_2}$$

$$F_{54} = -C_{44}(q+Q)\omega^{-2}\frac{d^2}{dx_1 dx_2}$$

$$F_{55} = -C_{44}(q+Q)\omega^{-2}\frac{d^2}{dx_2^2}$$

Finally, $$\begin{bmatrix} F_{66} & F_{61} & F_{62} \\ F_{16} & F_{11} & F_{12} \\ F_{26} & F_{21} & F_{22} \end{bmatrix} = \begin{bmatrix} F_{33} & F_{34} & F_{35} \\ F_{43} & F_{44} & F_{45} \\ F_{53} & F_{54} & F_{55} \end{bmatrix}^T$$

where T denotes transpose. The other terms of $F_{ij}$, such as $F_{13}$, $F_{14}$, $F_{15}$, $F_{23}$, $F_{24}$, $F_{25}$, $F_{31}$, $F_{32}$, $F_{35}$, etc. may (or may not) be 0, for instance due to symmetries.

The local filters given above are exact but cumbersome expressions to work with because the differential operators may not be evaluated while under the square root sign. In addition, the filters as they stand are non-local since differential operators appear in the denominators. To fix this, a solution is to expand the filters in terms of Taylor series. As series expansions can be developed in many ways and to varying accuracy, we give one example to demonstrate how the filters $F_{33}$, $F_{34}$, $F_{35}$ may appear in terms of Thomsen parameters after a series expansion:

$$F_{33} = 1 + \frac{2\beta^2}{\omega^2(\alpha^2-\beta^2)^2}[(1+\delta)\alpha^2 - \beta^2]\left[\left(1+\frac{\delta}{2}\right)\alpha^2 - \beta^2\right]\left(\frac{d^2}{dx_1^2} + \frac{d^2}{dx_2^2}\right) -$$

$$\frac{2\alpha^2\beta^2}{\omega^4(\alpha^2-\beta^2)}[3\alpha^2(\varepsilon-\delta) - 2\beta^2\delta]\left(\frac{d^2}{dx_1^2} + \frac{d^2}{dx_2^2}\right)^2$$

$$F_{34} = 1 + \frac{\alpha^2}{\alpha^2-\beta^2}\delta - \frac{2i\alpha^2}{\omega^3(\alpha^2-\beta^2)^3}[(1+\delta)\alpha^2 - \beta^2]$$

$$[(\alpha^2+\beta^2)(\varepsilon-\delta) - 2\alpha^2\beta^2\varepsilon]\left(\frac{d^2}{dx_1^2} + \frac{d^2}{dx_2^2}\right)\frac{d}{dx_1}$$

$$F_{35} = 1 + \frac{\alpha^2}{\alpha^2-\beta^2}\delta - \frac{2i\alpha^2}{\omega^3(\alpha^2-\beta^2)^3}[(1+\delta)\alpha^2 - \beta^2]$$

$$[(\alpha^2+\beta^2)(\varepsilon-\delta) - 2\alpha^2\beta^2\varepsilon]\left(\frac{d^2}{dx_1^2} + \frac{d^2}{dx_2^2}\right)\frac{d}{dx_2}$$

FIG. 1 shows an example of the present invention in use. In this example, a simple 3D isotropic model with two layers was used. Of course, more complex anisotropic models can also be used. The uppermost layer is defined by velocities $\alpha=1500$ m/s (compression wave velocity) and $\beta=0$ m/s (shear wave velocity). The uppermost layer may therefore represent sea water or the like. The lowermost layer is defined by velocities $\alpha=3000$ m/s and $\beta=750$ m/s. The density is kept constant in both layers to $\rho=1.0$ g/cm$^3$.

As can be seen from FIG. 1, this example demonstrates that the method attenuates the dispersive shear waves appearing within the elastic part of the model (e.g. the lowermost layer) using the present method. A point source is placed at 10 meters depth in the z direction of FIG. 1 and at 0 meters offset in the x direction of FIG. 1. The modeling is done with second order time update and fourth order spatial differentiation operators (Virieux, 1986). The edges of the modeled wavefield are damped to avoid artificial reflections.

Figure 1B:
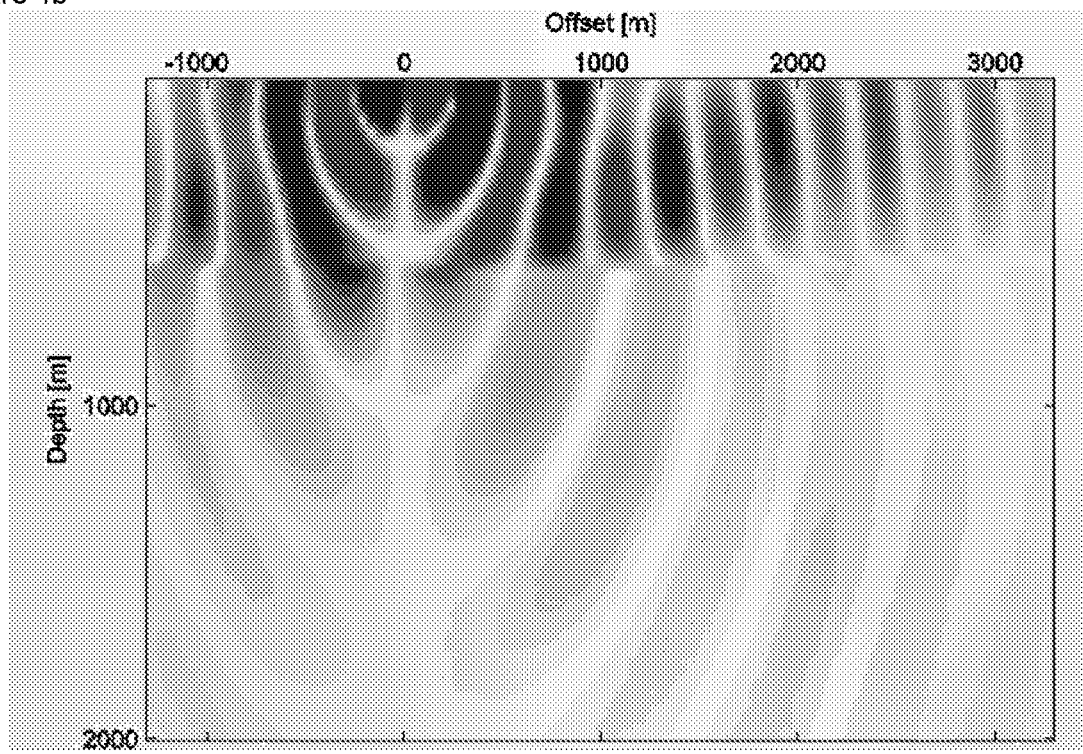

FIG. 1 shows the forward modeled $v_1$-component of the wavefield in a 2D section along the y-location of the source. FIG. 1 shows the $v_1$-component relative to the horizontal x direction (the offset) and the vertical z direction (the depth). The wavefield component is extracted at 3 Hz. The modeling is carried on for the time needed for the dispersive shear-wave to propagate out of the model into the absorbing layers at the edges of the model. FIG. 1a shows the modeled $v_1$-component with the dispersive shear-waves from the modeling; and FIG. 1b shows the modified, filtered, reconstructed $\tilde{v}_1$-component where the dispersive shear waves are attenuated according to the present method.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

REFERENCES

Chapman, C. H. and J. O. A. Robertsson, 2013, Correcting an acoustic simulation for elastic effects: U.S. Pat. No. 8,437,219 B2.

Chapman, C. H., J. W. D. Hobro and J. O. A. Robertsson, 2010, Elastic corrections to acoustic finite-difference simulations: 80th Annual International Meeting, SEG, Expanded Abstracts, 29, 3013-3017.

Chapman, C. H., J. W. D. Hobro and J. O. A. Robertsson, 2014, Correcting an acoustic wavefield for elastic effects: Geophys. J. Int. doi: 10.1093/gji/ggu057

Hobro, J. W. D., Chapman, C. H., and J. O. A. Robertsson, 2011, Elastic corrections to acoustic finite-difference simulations: Plane wave analysis and examples: 73rd EAGE Conference and Exhibition, Expanded Abstracts, 1, 61-65.

Moczo, P., Robertsson, J, O. A., and Eisner, L., 2007. The finite-difference time-domain method for modelling of seismic wave propagation. In Wu, R. S., and Maupin, V. (eds.), Advances in wave propagation in heterogeneous Earth, Vol. 48, Advances in Geophysics (ed. R. Dmowska). Oxford: Elsevier-Pergamon, pp. 421-516.

Robertsson, J. O. A., and Blanch, J. O., 2011, Numerical methods, finite difference: In Encyclopedia of Solid Earth Geophysics: Springer.

Virieux, J., 1986. P-SV wave propagation in heterogeneous media: Velocity-stress finite-difference method: Geophysics 51, no. 4, pp. 889-901.

We claim:

1. A method of seismic processing comprising:
performing seismic modeling using an elastic model of a geographical structure to provide modified synthetic seismic data, the elastic model comprising a grid having a grid spacing sized such that, when synthetic seismic data is generated using the elastic model, synthetic shear wave data exhibits numerical dispersion, the seismic modeling comprising:
generating generated synthetic seismic data using said elastic model, wherein the generated synthetic seismic data comprises synthetic compression wave data and synthetic shear wave data; and
modifying the generated synthetic seismic data to produce the modified synthetic seismic data by attenuating at least some of the synthetic shear wave data in order to attenuate at least some of the numerically dispersive data; and
the method of seismic processing further comprising using measured seismic data and the modified synthetic seismic data to produce an updated model of the geographical structure;
wherein using the seismic model to prospect for hydrocarbons comprises using the seismic model to identify locations for drilling and/or well locations; and
further comprising drilling at and/or into the identified locations.

2. A method as claimed in claim 1, wherein the grid spacing is sized such that, when synthetic seismic data is generated using the elastic model, the synthetic shear wave data exhibits numerical dispersion and substantially all of the synthetic compression wave data exhibits no numerical dispersion.

3. A method as claimed in claim 1, wherein the grid spacing is sized to be as large as possible without substantially any of the synthetic compression wave data comprising numerical dispersion.

4. A method as claimed in claim 1, wherein the grid spacing is sized such that the slowest compression wave data is the slowest wave that undergoes substantially no numerical dispersion in the model.

5. A method as claimed in claim 1, wherein the model comprises a time step, wherein the time step is sized such that, when generated synthetic seismic data is generated using the elastic model, the generated synthetic seismic data is substantially stable.

6. A method as claimed in claim 1, wherein the generated synthetic shear wave data comprises a first portion consisting of data that exhibits numerical dispersion and a second portion consisting of data that exhibits no numerical dispersion, and the method comprises attenuating at least some of the first portion.

7. A method as claimed in claim 1, wherein attenuating at least some of the generated synthetic shear wave data comprises applying one or more filters to the generated synthetic seismic data.

8. A method as claimed in claim 1, wherein the elastic model is a 3D elastic model.

9. A method as claimed in claim 1, wherein the elastic model is an isotropic elastic model.

10. A method as claimed in claim 1, wherein the elastic model is an anisotropic elastic model.

11. A method as claimed in claim 1, wherein the model comprises at least one location where at least one reflection in the generated synthetic seismic data occurs, and the method comprises obtaining one or more reflection coefficients for the reflection location and using said one or more reflection coefficients when generating the generated synthetic seismic data.

12. A method as claimed in claim 1, wherein the elastic model is an elastic model representing a real geophysical structure, and wherein the measured seismic data is acquired from the real geophysical structure, the method comprising:
comparing the measured seismic data with the modified seismic data; and
updating the model based upon the comparison to produce a more accurate model of the geophysical structure.

13. A method as claimed in claim 12, wherein the model that is updated based upon the comparison is a reflectivity model and/or the elastic model on which the generated geophysical data is generated.

14. A method as claimed in claim 12, comprising repeating the steps of generating generated synthetic seismic data, attenuating the generated synthetic seismic data to produce modified synthetic seismic data, comparing the modified synthetic seismic data and updating the model based on the comparison.

15. A method as claimed in claim 12, comprising acquiring the measured seismic data from the geophysical structure.

16. A computer program product comprising computer readable instructions that, when run on a computer, is configured to perform the method of claim 1.

17. A method of prospecting for hydrocarbons, comprising:
performing the method of claim 1; and
using the seismic model to prospect for hydrocarbons.

18. A method of producing hydrocarbons, comprising:
performing the method of claim 1; and
producing hydrocarbons.

* * * * *